United States Patent
Shumate (10) Patent No.: US 9,482,371 B2
(45) Date of Patent: *Nov. 1, 2016

(54) SYSTEMS AND METHODS FOR INSULATING A PIPE

(71) Applicant: JOHNS MANVILLE, Denver, CO (US)

(72) Inventor: Monroe William Shumate, Littleton, CO (US)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,069

(22) Filed: Feb. 23, 2016

(65) Prior Publication Data

US 2016/0169419 A1 Jun. 16, 2016

Related U.S. Application Data

(62) Division of application No. 12/855,876, filed on Aug. 13, 2010.

(51) Int. Cl.

| | |
|---|---|
| *F16L 9/14* | (2006.01) |
| *B32B 5/02* | (2006.01) |
| *B32B 7/12* | (2006.01) |
| *B32B 15/20* | (2006.01) |
| *B32B 27/36* | (2006.01) |
| *B32B 29/02* | (2006.01) |
| *F16L 59/02* | (2006.01) |
| *B32B 15/14* | (2006.01) |
| *B32B 27/12* | (2006.01) |
| *B32B 1/08* | (2006.01) |
| *B32B 37/12* | (2006.01) |
| *B32B 37/14* | (2006.01) |

(Continued)

(52) U.S. Cl.
CPC . *F16L 9/14* (2013.01); *B32B 1/08* (2013.01); *B32B 5/028* (2013.01); *B32B 7/12* (2013.01); *B32B 15/14* (2013.01); *B32B 15/20* (2013.01); *B32B 27/12* (2013.01); *B32B 27/36* (2013.01); *B32B 29/02* (2013.01); *B32B 37/12* (2013.01); *B32B 37/14* (2013.01); *F16L 59/022* (2013.01); *F16L 59/14* (2013.01); *B32B 2038/0092* (2013.01); *B32B 2255/205* (2013.01); *B32B 2262/101* (2013.01); *B32B 2307/202* (2013.01); *B32B 2307/304* (2013.01); *B32B 2597/00* (2013.01); *Y10T 428/1314* (2015.01); *Y10T 428/1359* (2015.01)

(58) Field of Classification Search
CPC .......... F16L 9/14; B32B 37/12; B32B 37/14; B32B 2597/00
See application file for complete search history.

(56) References Cited

U.S. PATENT DOCUMENTS

| | | |
|---|---|---|
| 3,318,063 A | 5/1967 | Stone et al. |
| 3,442,750 A | 5/1969 | Wilcox |
| 4,054,710 A | 10/1977 | Botsolas |

(Continued)

*Primary Examiner* — Michael C Miggins
(74) *Attorney, Agent, or Firm* — Robert D. Touslee (57) ABSTRACT

A pipe insulation product including a core of insulating material and a laminate. The core includes a cylindrical outer surface; a cylindrical inner surface; and a wall extending between the cylindrical outer surface and the cylindrical inner surface. The laminate includes a metallized polymeric film sheet layer forming an inner layer, a scrim, a porous media sheet layer, and a polymeric film sheet layer forming an outer exposed layer bonded together via an adhesive. The laminate is coextensive with and bonded to the cylindrical outer surface of the core and the laminate and core are flexible so that the core and laminate can be opened, placed about a pipe, and closed without degrading the laminate.

8 Claims, 4 Drawing Sheets

(51) Int. Cl.
  *F16L 59/14*     (2006.01)
  *B32B 38/00*     (2006.01)

(56) References Cited

U.S. PATENT DOCUMENTS

| | | |
|---|---|---|
| 4,371,579 A | 2/1983 | McCaskey et al. |
| 4,606,957 A | 8/1986 | Cohen |
| 4,764,420 A | 8/1988 | Gluck et al. |
| 4,780,347 A | 10/1988 | Cohen |
| 4,980,205 A | 12/1990 | Haskell |
| 5,516,580 A | 5/1996 | Frenette et al. |
| 5,776,841 A | 7/1998 | Bondoc et al. |
| 6,284,077 B1 | 9/2001 | Lucas et al. |
| 2004/0137181 A1 | 7/2004 | Ruid et al. |
| 2008/0081138 A1 | 4/2008 | Moore et al. |

SYSTEMS AND METHODS FOR INSULATING A PIPE

CROSS-REFERENCES TO RELATED APPLICATIONS

This patent application is a division of pending U.S. patent application Ser. No. 12/855,876, filed Aug. 13, 2010.

This application is related to the following Non-Provisional U.S. Patent Applications: U.S. patent application Ser. No. 12/855,833 filed on Aug. 13, 2010 by Shumate et al., entitled "Insulation Product with Inward Curling Closure Flap;" U.S. patent application Ser. No. 12/855,856 filed on Aug. 13, 2010 by Shumate et al., entitled "Pipe Insulation Product with Charge Dissipator;", now U.S. Pat. No. 8,104,519 issued Jan. 31, 2012; and U.S. patent application Ser. No. 12/855,868 filed on Aug. 13, 2010 by Shumate et al., entitled "Pipe Insulation Products and Methods", now U.S. Pat. No. 8,141,594 issued Mar. 27, 2012

The entire disclosures of all of the aforementioned Non-Provisional U.S. Patent Applications are hereby incorporated by reference, for all purposes, as if fully set forth herein.

BACKGROUND OF THE INVENTION

The subject invention relates generally to pipe insulation products and more specifically to pipe insulation products comprising a insulating material core surrounded by a laminate.

Piping is often used to transport one or more fluids between destinations. For example, piping may be used to transport water, petroleum, oxygen, etc. The piping is often made from a metal material, such as copper, stainless steel, galvanized steel, aluminum, brass, titanium, etc., or from a plastic material, such as polyvinyl chloride (PVC), chlorinated polyvinyl chloride (CPVC), fiber reinforced plastic (FRP), polypropylene (PP), polyethylene (PE), etc. Piping may also be made from a ceramic, fiberglass, or concrete material, although these pipes are less common.

During fluid transportation, the fluid may be subject to heating and/or cooling from the surrounding environment. For example, the fluid may be transported in either a hot or cold state relative to the surrounding environment, which induces heat transfer to or from the fluid and pipes. HVAC systems are a common example of systems that routinely utilize various pipe configurations to transport hot or cold fluids. Due to the conductive nature of the pipes (especially metal pipes), heat may be conducted to or from the fluid during transportation. The addition or removal of heat may result in the decreased efficiency of a system and/or increased time and/or expense in operating the system. For example, in HVAC systems, the addition of heat to cooled fluids may result in loss of efficiency for a cooling unit and may also result in increased expense because of increased operating time and energy needed to achieve a desired cooling level.

To reduce heat transfer during fluid transportation, pipe insulation products are commonly installed on the pipes of a piping system to retard the flow of heat to and from the pipes. Commonly, one or more sections of pipe are fitted with a pipe insulation product where the sections of pipe are generally fully encased within the pipe insulation product. Common pipe insulation products comprise a fibrous insulation material that is surrounded by and encased within a laminate. Separate sections of pipe insulation product are often coupled together via adhesive tapes. The laminates of the pipe insulation product often enhance the visual appeal of the piping system and serve as a means for sealing the pipe insulation product about the pipes of the piping system. Individual segments of pipe insulation products typically range in length from about 36 inches to about 48 inches; have a wall thickness ranging from about 0.5 inches to about 3 inches; and a range in outside diameter from about 2 inches to about 32 inches. The pipe insulation product may also be used to reduce degradation and/or corrosion of the pipe.

The laminate of the pipe insulation product, however, is often susceptible to handling damage during installation. For example, scuff marks and/or creases may form on the laminate as the pipe insulation product is shipped and/or fitted about a pipe. In addition, the laminate is often degraded and/or damaged after prolonged exposure to one or more types of environments. For example, laminates may begin to form wrinkles and/or dimples after prolonged exposure to high heat and/or humidity environments. Other types of damage may include UV damage, heat damaged, etc. This damage often leaves visible marks or scars that are apparent to individuals viewing the piping system and pipe insulation product. The visible marks may degrade the overall appearance of the building or structure in which they are used and/or may leave a negative impression on the viewer as to the quality of the pipe insulation product.

BRIEF SUMMARY OF THE INVENTION

The laminate of the pipe insulation product of the present invention provides superior resistance to both handling damage and environmental damage. The pipe insulation product of the present invention may include a tubular core of insulating material and a laminate that is bonded to the tubular core of insulating material. The tubular core may include a length and a longitudinal axis, a substantially cylindrical outer surface, a substantially cylindrical inner surface, and a wall extending between the cylindrical outer surface and the cylindrical inner surface. The wall may have a radially extending thickness and a slit extending parallel to the longitudinal axis for the length of the tubular core and extending completely through the wall from the cylindrical outer surface to the cylindrical inner surface.

The laminate may be coextensive with and bonded to the substantially cylindrical outer surface of the tubular core and flexible so that the tubular core and laminate can be opened, placed about a pipe, and closed without degrading the laminate. The laminate may include a metallized polymeric film sheet layer that forms an inner layer of the laminate (e.g., metallized polyethylene terphthalate (MPET)). The metallized polymeric film sheet layer may be bonded to the substantially cylindrical outer surface of the tubular core and may provide a fluid vapor barrier to minimize fluid vapor transmission through the laminate.

The laminate may also include a scrim that includes a mesh of a plurality of fibers. The laminate may further include a porous media sheet layer. The scrim and/or the porous media sheet layer may provide reinforcement for the laminate (e.g., provide puncture resistance, durability, tensile strength, etc.) The laminate may additionally include a polymeric film sheet layer that forms an outer exposed layer of the laminate. The laminate may additionally include an adhesive that bonds the metallized polymeric film sheet layer, the scrim, the porous media sheet layer, and the polymeric film sheet layer together. The adhesive may be a latex based adhesive and may contain either or both a flame retardant additive and an anti-microbial agent additive.

The pipe insulation product (i.e., the tubular core and laminate) may be used in a high heat and/or humidity environment where the laminate is substantially free from wrinkling and/or dimpling after prolonged exposure to the high heat and/or humidity environment. In addition, fluid (e.g., hot or cold fluid relative to the environment) may be passed through the interior of the insulated pipe where the metallized polymeric film sheet layer substantially reduces the amount of fluid vapor that is able to penetrate through the laminate from the environment.

The present invention may also include a method for producing a laminate jacket for a pipe insulation product. The method may include obtaining a metallized polymeric sheet material, where the metallized polymeric sheet material forms an inner layer of the laminate and where the metallized polymeric sheet material provides a fluid vapor barrier to minimize fluid vapor transmission through the laminate. The metallized polymeric sheet material may include a length, a width, a first face, and a second face. The length and width may form an area that defines the first face and the second face. The metallized polymeric sheet material may be made of metallized polyethylene terphthalate (MPET).

The method may also include positioning a scrim adjacent to the second face. The scrim may be substantially coextensive with the second face and may include a mesh of a plurality of fibers. The method may further include positioning a porous media sheet material directly adjacent to the scrim. The porous media sheet material may be substantially coextensive with the second face. The method may additionally include positioning a polymeric sheet material directly adjacent to the porous media sheet material. The polymeric sheet material may be made form polypropylene, polyethylene, etc. The polymeric sheet material may be coextensive with the second face and may form an outer exposed layer of the laminate. The method may additionally include bonding the metallized polymeric sheet material, the scrim, the porous media sheet material, and the polymeric sheet material together with an adhesive material to form the laminate jacket. The adhesive may include a flame retardant additive and an anti-microbial agent additive.

The laminate may be bonded with a tubular core of insulating material to form a pipe insulation product. The method for bonding the laminate and tubular core may include positioning the tubular core of insulating material directly adjacent to the first face of the metallized polymeric sheet material. The tubular core may include a length and a longitudinal axis, a substantially cylindrical outer surface that includes a surface area roughly equivalent to the area of the first face, a substantially cylindrical inner surface, and a wall extending between the cylindrical outer surface and the cylindrical inner surface. The wall may include a radially extending thickness and a slit extending parallel to the longitudinal axis of the tubular core for the length of the tubular core and extending completely through the wall from the cylindrical outer surface to the cylindrical inner surface.

The method may also include bonding the tubular core of insulating material and the first face of the metallized polymeric sheet material with an adhesive material to form the pipe insulation product. The pipe insulation product may be flexible so that the tubular core and laminate jacket can be opened, placed about a pipe, and closed without degrading the laminate jacket.

The present invention may further include an insulated pipe. The insulated pipe may include a pipe with a cylindrical outer surface and a hollow interior for passing a fluid there through. The insulated pipe may also include a tubular core of insulating material that includes a length and a longitudinal axis, a substantially cylindrical outer surface, a substantially cylindrical inner surface that is sized to correspond with the diameter of the pipe outer surface; and a wall extending between the cylindrical outer surface and the cylindrical inner surface. The wall may have a radially extending thickness and a slit that extends completely through the wall and that extends parallel to the longitudinal axis of the tubular core.

The insulated pipe may further include a laminate that is coextensive with and bonded to the substantially cylindrical outer surface of the tubular core and that is flexible so that the tubular core and laminate can be opened, placed about the pipe, and closed without degrading the laminate. The laminate may include a metallized polymeric film sheet layer that forms an inner layer of the laminate. The metallized polymeric film sheet layer may be bonded to the substantially cylindrical outer surface of the tubular core and may provide a fluid vapor barrier to minimize fluid vapor transmission through the laminate. The laminate may also include a scrim positioned adjacent to the metallized polymeric film sheet layer. The laminate may further include a porous media sheet layer that is positioned adjacent to the scrim.

The laminate may additionally include a polymeric film sheet layer that is positioned adjacent to the porous media sheet layer and that forms an outer exposed layer of the laminate. The polymeric film sheet layer may inhibit the absorption of fluid by the porous media sheet layer. The metallized polymeric film sheet layer, the scrim, the porous media sheet layer, and the polymeric film sheet layer may be bonded together using an adhesive. The laminate may provide increased resistance to handling damage during installation and/or shipment of the laminate and/or may provide increased resistance to wrinkling when exposed to conditions of high or low humidity and/or high heat.

A fluid may be passed through the hollow interior of the pipe where the fluid has a lower temperature than the surrounding environment. The metallized polymeric film sheet layer may substantially reduce the amount of fluid vapor that penetrates through the laminate from the surrounding environment. In addition, the insulated pipe that includes the pipe, tubular core, and laminate may be utilized in a high heat and/or humidity environment and the laminate may be substantially free from wrinkling after a prolonged exposure to the high heat and/or humidity environment.

The present invention may additionally include a method for insulating a pipe having a cylindrical outer surface and a hollow interior for passing a fluid there through. The method may include providing a tubular core of insulating material. The tubular core may include a length and a longitudinal axis, a substantially cylindrical outer surface, a substantially cylindrical inner surface that is sized to correspond to cylindrical outer surface of the pipe, and a wall extending between the cylindrical outer surface and the cylindrical inner surface. The wall may have a radially extending thickness and a slit that extends completely through the wall from the cylindrical outer surface to the cylindrical inner surface. The slit may further extend parallel to the longitudinal axis of the tubular core for the length of the tubular core.

The method may also include bonding a laminate to the tubular core, where the laminate is coextensive with the cylindrical outer surface of the tubular core. The laminate may include a metallized polymeric film sheet layer that forms an inner layer of the laminate. The metallized polymeric film sheet layer may be bonded to the cylindrical outer surface of the tubular core and may provide a fluid vapor barrier to minimize fluid vapor transmission through the laminate. The laminate may also include a scrim that is positioned adjacent to the metallized polymeric film sheet layer. The laminate may further include a porous media sheet layer that is positioned adjacent to the scrim. The laminate may additionally include a polymeric film sheet layer that is positioned adjacent to the porous media sheet layer and that forms an outer exposed layer of the laminate. The polymeric film sheet layer may inhibit the absorption of fluid by the porous media sheet layer. The metallized polymeric film sheet layer, the scrim, the porous media sheet layer, and the polymeric film sheet layer may be bonded together using one or more adhesives.

The method may also include flexing the tubular core and laminate to open the laminate and tubular core. The method may further include placing the laminate and tubular core about the pipe and closing the laminate and tubular core about the pipe without degrading the laminate. Upon closing the laminate and tubular core, at least a portion of the pipe may be fully encased within the laminate and tubular core. The laminate may provide increased resistance to handling damage during installation and/or shipment of the laminate and tubular core. Similarly, the laminate may provide increased resistance to wrinkling when exposed to conditions of high or low humidity and/or conditions of high heat.

The method may additionally include flowing a fluid through the pipe, where the temperature of the fluid is lower than the temperature of the surrounding environment in close proximity to the laminate's outer surface. The metallized polymeric film sheet layer may substantially reduce the amount of fluid vapor that penetrates through the laminate from the laminate's exterior (i.e., the surrounding environment).

DETAILED DESCRIPTION OF THE INVENTION

The present invention relates to a laminate jacket, or simply a laminate, that is used with a tubular core of insulating material (i.e., fiberglass pipe insulation) to insulate one or more sections of pipe. Laminates used to cover fiberglass pipe insulation have to meet many performance requirements. These include minimal flame and smoke propagation, tensile strength, puncture resistance, mold growth resistance, high temperature resistance, dimensional stability, UV and visible light stability, and low water vapor permeance. Low water vapor permeance may be an important feature in pipe insulation involving chilled water systems to prevent condensation on pipes, which could lead to mold growth, water damage, dripping water damage, staining, loss of insulating value, pipe corrosion, etc. Preferably, the laminate has a water vapor transmission rate of a maximum of 0.02 perms.

In addition, there are many other qualitative customer requirements that the jacket must meet including environmental damage resistance (e.g., wrinkling or dimple), handling damage resistance, low reflectivity, and a smooth, uniform surface. The handling required by installers to transport, cut, hang, seal a closure flap, install butt strips, etc. often results in wrinkles, hand prints, and other visual scars that lack aesthetic appeal. Likewise, after prolonged exposure to one or more environmental conditions in which the laminate is used (e.g., high humidity, direct sunlight, etc.), the laminate may begin to show visual scars from the environment condition (e.g., wrinkling, dimpling, fading, etc.). The aesthetic value of the laminate is important because customers desire pipe insulation products that have both exceptional functionality as well as appearance. The overall appearance of the installed pipe insulation product may result in increased sales and/or market share. Thus, providing a product that is superior in both performance and appearance is highly desired.

The laminate of the present invention exhibits enhanced dimensional stability; reduced deformation and wrinkling/dimpling; mold and mildew growth resistance; stain resistance; improved tape adhesion; improved ease of cleaning; enhanced flame spread resistance; good handleability; UV resistance; surface abrasion resistance; and overall good surface aesthetics prior to, during, and after installation.

Figure 1:
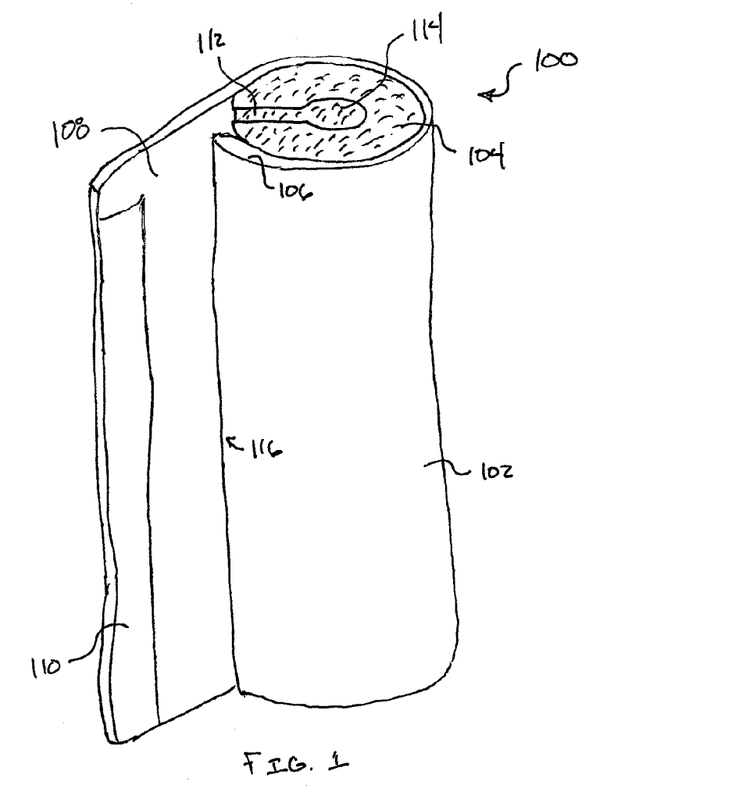
FIG. 1 is a schematic perspective view of a laminate jacket pipe insulation product wherein the jacket is made from a laminate of the present invention.

As shown in FIG. 1, a laminate jacket pipe insulation product 100 may include a tubular core of insulating material 104 that may include a substantially cylindrical outer surface (i.e., the outside of the tubular core that directly contacts the laminate) and a substantially cylindrical inner surface 114. Extending between the cylindrical outer surface and the cylindrical inner surface 114 may be a wall of insulating material. The insulating material provides the insulating properties of the laminate jacket pipe insulation product 100. In one embodiment, the insulating material may be a fibrous material (e.g., fiberglass, mineral wool, refractory ceramic fiber, chopped strand fiber glass, etc.). In other embodiments the insulating material may be a foam (e.g., phenolic foam, polyisocyanurate, polyolefin, polystyrene, polyurethane), a polymer, foam glass, microporous insulation (e.g., Microtherm®), or any other material that provides insulation.

The cylindrical inner surface 114 may be configured to correspond with a specific pipe outer diameter (e.g., ½ inch, 1 inch, etc.). The tubular core 104 may also include a longitudinally extending slit 112 that passes completely through the wall of insulating material on one side and into the interior of the substantially cylindrical inner surface 114 so that the tubular core 104, and thus the laminate jacket pipe insulation product 100, can be opened, passed over, and closed about a pipe.

Circumferentially surrounding and encasing the tubular core 104 is a laminate jacket or simply a laminate 102. The laminate 102 has a thickness 106 that includes one or more layers of various materials as described below. The laminate 102 is roughly co-extensive with the tubular core 104 and bonded to the cylindrical outer surface. The laminate 102 may be positioned so that a longitudinal edge portion 116 extends parallel and adjacent to the slit 112, but does not overlap the slit 112. The laminate 102 includes a closure flap 108 that may have a pressure sensitive adhesive layer 110 so that the laminate 102 may be adhesively sealed in a closed position fully encasing the tubular core 104 within the laminate 102. The laminate may be sealed by folding or overlapping the closure flap 108 over the longitudinal edge portion 116 of the laminate 102 and by applying pressure to the pressure sensitive adhesive layer 110 so that the closure flap 108 adhesively seals to the longitudinal edge portion 116. The closure flap 108 may include a removable silicone treated release strip (not shown) removably adhered to the pressure sensitive adhesive layer 110 to protect the adhesive material from degradation prior to installation. Maintaining a sealed closed position is an important function of the closure flap 108 and adhesive layer 110 so that the insulated pipe is not subjected to one or more environmental elements, such as water vapor.

The laminate 102 of the present invention may include one or more flame retardants, fungi growth inhibiting agents, and/or other additives to enhance the performance and/or the adhesion of the laminate. The laminate jacket pipe insulation product 100 may be used with one or more of the following: pipe insulation, duct board, duct wrap insulation, metal building insulation, and other building insulation products. The insulated pipes may be used in various environmental conditions including cycles of high heat and humidity, which may affect the laminate 102 as described below (e.g., wrinkling, dimpling, fading, etc.). The laminate 102 is particularly well suited for insulating pipes in such conditions.

Figure 2:
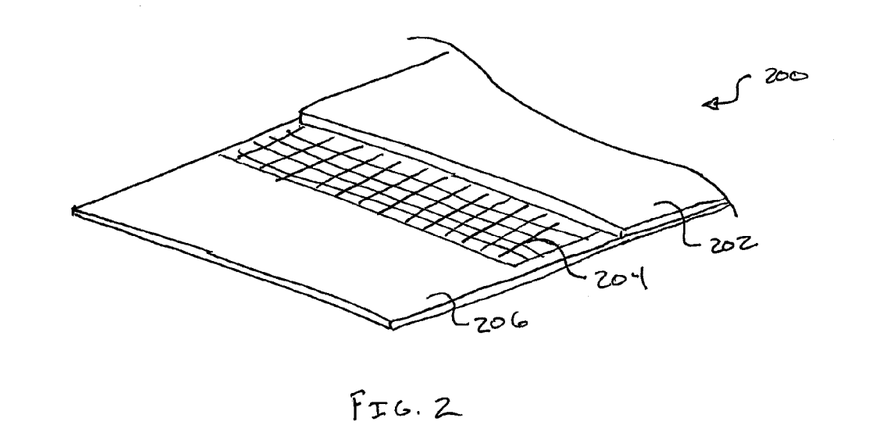
FIG. 2 is a schematic perspective view of a laminate jacket according to one embodiment of the present invention with portions of the laminate broken away to show the various layers of the laminate.

FIG. 2 depicts a laminate jacket 200 according to one embodiment of the present invention. FIG. 2 shows portions of the laminate 200 broken away to reveal the various layers of the laminate. The laminate 200 may include an inner layer composed of a foil or metallized polymeric film sheet 206. The foil 206 may include an aluminum foil between about 0.00025 inches and about 0.001 inches in thickness (between about 0.25 mils and about 1 mil in thickness) and/or the metallized polymeric film sheet 206 may include metallized polyethylene terphthalate (MPET) between about 0.48 mils and about 100 mils in thickness (between about 48 and 100 gauge in thickness). The inner layer aluminum foil or MPET provides a nearly impermeable fluid vapor barrier to fluids that are external to and surrounding the laminate jacket pipe insulation product 100. For example, the foil or metallized polymeric film sheet 206 is nearly impermeable to water vapor, which protects the insulated pipe from water condensation, corrosion, loss of insulating value, mold growth, etc. The use of either a foil (e.g., aluminum foil) or a metallized polymeric film sheet (e.g., MPET) 206 enables the laminate to provide a water vapor transmission rate of less than 0.02 perms. By using the foil or metallized polymeric film sheet 206, fluid may be passed through the insulated pipe and fluid vapor (e.g., water vapor) in the surrounding environment may be restricted (or kept) from penetrating through laminate to the pipe. When cold fluid is passed through the pipe, the foil or metallized polymeric film sheet 206 prevents water vapor from condensing on the pipes and corroding or degrading the pipes, staining the laminate jacket or other surrounding objects, dripping onto a surface and causing damage, causing mold or fungal growth, etc.

The laminate 200 may also include a layer of scrim 204 that may be positioned directly adjacent to the metallized polymeric film sheet 206. The scrim 204 may function to reinforce and strengthen the laminate 200. For example, the scrim provides the laminate with increased tensile strength, puncture resistance, etc. The scrim 204 may be made of fiberglass reinforcing yarn, such as but not limited to a G75 or H110 yarn. In addition, the yarn may be configured to be from 2 to 6 strands per inch in both the machine and cross machine direction, with a typical scrim being about 5 strands per inch in both directions. In some embodiments the scrim 204 may be made of polyester strings or any other synthetic string.

The laminate 200 may further include a porous media outer sheet layer 202 that may be positioned directly adjacent to the scrim 204. The porous media may include a kraft paper sheet that is preferably between about 35 and 55 pounds/3000 square feet and that may include one or more additives to enhance the performance of the laminate 200. For example, the porous media may include one or more fire retardant additives and/or anti-microbial agents to prevent mold or fungal growth and to prevent propagation of smoke and/or fire. The porous nature of the porous media may facilitate in absorbing and retaining the one or more additives within the porous media, and hence, within the laminate. For ease of description, the porous media will be referred to herein as kraft paper, although it should be understood that various types of porous media may be used (e.g., fiberglass mat, synthetic mat, paper, etc.). The foil or polymeric film sheet 206, the scrim 204, and the kraft paper/porous media 202 may be bonded or adhered using one or more adhesives as described below.

The kraft paper and polymeric film (including MPET) may be potential fuel sources for a fire. Because both the kraft paper and polymeric film sheet (metallized and non-metallized) are potential fuel sources, including additional layers and/or increasing the thickness of the kraft paper and/or polymeric film in traditional laminate jackets may be limited due to smoke and fire propagation regulations and/or other concerns.

Some laminate jackets have eliminated the kraft paper layer entirely in favor of an all polymeric film outer layer. The polymeric materials are generally non-porous and, thus, not able to absorb and retain fire retardant additives and/or other additives. As such, these jackets may be more susceptible to burning and/or may drip burning plastic when ignited. These jackets may pose an un-acceptable fire hazard in buildings or systems in which they are installed. As described below, the laminate jacket of the present invention is able to utilize additional layers and/or thicknesses of polymeric film materials and/or kraft papers without posing an increased fire hazard.

Figure 3:
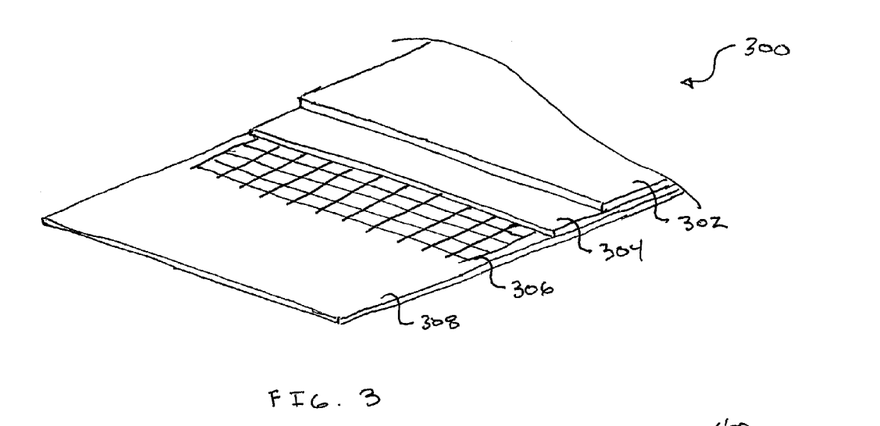
FIG. 3 is a schematic perspective view of a laminate jacket according to another embodiment of the present invention with portions of the laminate broken away to show the various layers of the laminate.

FIG. 3 depicts a laminate jacket 300 according to another embodiment of the present invention. FIG. 3 shows portions of the laminate 300 broken away to reveal the various layers of the laminate. The laminate 300 may include an inner layer composed of a foil or metallized polymeric film sheet 308. Preferably, the laminate 300 includes an inner layer that is made of metallized polyethylene terphthalate (MPET) between about 0.48 mils and about 100 mils in thickness (between about 48 and 100 gauge in thickness). The MPET inner layer provides the various advantages described above (e.g., water vapor barrier). In addition, the use of the MPET in the laminate application provides increased resistance to handling damage such as creasing or wrinkling as described below.

The laminate 300 also include a scrim 306, such as a mesh of glass fibers, as previously described. The scrim 306 may reinforce the laminate 300 as previously described. The laminate 300 may further include a kraft paper or porous media layer 304, such as the kraft paper layer previously described, and/or may include another porous media layer such as a fiberglass or synthetic media layer. The stiffness of the kraft paper may provide increased stiffness and/or durability to the laminate 300. The scrim 306 and kraft paper 304 provide multiple reinforcing layers for the laminate 300. In some embodiments, a single reinforcement layer may be used in place of the scrim 306 and the kraft paper 304 (i.e., the scrim 306 and kraft paper 304 may be eliminated in favor of a single, preferably, porous media layer that provides similar stiffness and/or durability). In some embodiments the scrim 306 can be repositioned in relation to the kraft paper 304 so that the kraft paper 304 directly contacts the foil or metallized polymeric film sheet 308.

The laminate 300 additionally includes a polymeric film sheet outer layer 302 that may be positioned directly adjacent to the kraft paper 304. The polymeric film sheet may be made of polypropylene, polyethylene, polyvinyl chloride, vinyl, saran, polyethylene terephthalate, thermoplastic polyolefin, etc. The polymeric film sheet is generally non-porous and thus, unlike a kraft paper outer layer, the polymeric film may not be capable of absorbing and retaining additives (e.g., flame retardant). To ensure that the laminate 300 using the polymeric film sheet outer layer 302 is sufficiently resistant to flame and smoke propagation, the flame retardant additives and/or other additives may be included within the laminate. Using a porous media layer, such as the kraft paper 304, along with the proper type and amount of additives ensures that the polymeric film sheet outer layer provides sufficient fire and smoke propagation resistance (i.e., the polymeric film will not burn and/or drip burning plastic during a fire) even though the additives may not be present within the polymeric film layer.

In addition, the polymeric film sheet outer layer 302 may provide increased resistance to fluid absorption by the kraft paper/porous media 304 and/or by the insulating material (e.g., fiberglass material). For example, the polymeric film sheet 302 may shield or protect the kraft paper/porous media 304 from water vapor absorption during use in high temperature and high humidity environments (e.g. temperatures equal to or greater than 75° F. and relative humidities equal to or greater than 50%). The resistance to fluid absorption helps to minimize internal stresses within the laminate and/or prevent mold, mildew, and/or fungal growth. Likewise, the polymeric film sheet 302 may shield or protect the insulating material from fluid vapor (e.g., water vapor) absorption. This prevents the insulating material from becoming heavy or saturated with fluid and thereby prevents a loss in insulation value.

The metallized polymeric film sheet (i.e., MPET) inner layer 308, the scrim 306, the kraft paper 304, and the polymeric film sheet outer layer 302 may be bonded or adhered together using one or more adhesives (not shown).

The adhesive or adhesives used may be contact type, pressure sensitive, heat seal, etc. and may include one or more additives to enhance the performance, stiffness, dimensional stability, moisture resistance, handleability, fire and smoke propagation resistance, and/or durability of the laminate 300. Examples of adhesives that can be used include, but are not limited to, melamine, urea formaldehyde, phenolic, polyurethane, acrylic, latex, and acrylo-nitrile. Additional adhesives that can be used include adhesives that can migrate into the kraft paper layer 304 or other porous media to improve the physical characteristics of the laminate 300 by improving UV stability, flame spread resistance, opacification, color, etc. Examples of such migrating adhesives are colloidal silica or alumina, sodium or potassium silicate, ammonium phosphate stabilized with zinc oxide, magnesia or alumina; borax, and oxi-chloride stabilized with zinc oxide or magnesia. Of the above adhesives, a latex-laminating adhesive is the preferred adhesive.

While the adhesive does not need to contain fibers, the adhesive may include between about 1% and about 5% by weight synthetic and/or inorganic fibers such as but not limited to the synthetic and inorganic fibers and/or blends thereof set forth above for inclusion into the kraft paper 304 or other porous media layer of the laminate 300. Preferably, the adhesive also includes between about 0.5% and about 30% by weight flame retardant (e.g. aluminum tri-hydrate (ATH), decabrom with or without antimony, etc.), between about 10 ppm and about 100 ppm (0.01 to about 0.10% by dry weight) thiabendazole such as Metasol TK-100 or about 200 ppm and about 2000 ppm (preferably between 400 ppm and 600 ppm) 2-(4-Thiazolyl) Benzimidazole ("TBZ") as a mold and mildew growth retardant, and about 9% by dry weight magnesium hydrate to scavenge chlorine and protect the aluminum foil or metallized polyester film sheet 308 from chlorine degradation.

The laminate depicted in FIG. 3 includes an additional layer of polymeric film in comparison to the laminate depicted in FIG. 2 and includes more polymeric film layers and/or kraft paper layers than traditional laminates. As previously described, polymeric film and kraft paper materials provide a potential fuel source for potential fires. The use of the proper adhesives and/or kraft paper 304 or other porous media can ensure that the laminate provides sufficient flame and smoke propagation resistance and that the laminate passes all fire and smoke propagation regulations as well as all other necessary regulations. In some embodiments, the adhesive material is applied to one or more of the layers or between the layers during lamination and the adhesive material is absorbed by the kraft paper 304 or porous media. The adhesive material and/or the additives in the adhesive material may saturate and remain in the kraft paper 304 or porous media and thereby provide flame and smoke resistance and/or other resistances. In other embodiments, the kraft paper 304 or other porous media may be pre-saturated with one or more additives prior to applying the adhesive material (which may also contain one or more additives) during the lamination process.

Figure 4:
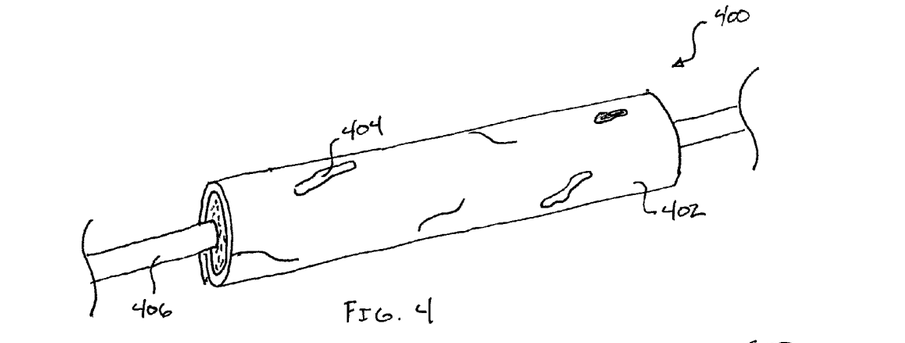
FIG. 4 is a schematic perspective view of a laminate jacket pipe insulation product fitted onto a cylindrical pipe section wherein the laminate jacket shows signs of handling damage.
Figure 5:
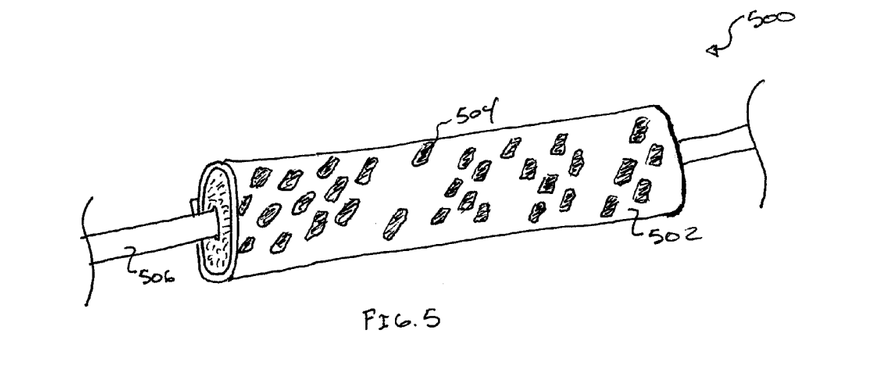
FIG. 5 is a schematic perspective view of a laminate jacket pipe insulation product fitted onto a cylindrical pipe section where the laminate jacket shows signs of environmental damage.

FIGS. 4 and 5 depict one or more types of damage that the laminate jacket pipe insulation product, 400 & 500 respectively, may experience during handling (e.g., shipping, installation, etc.) and/or during use. FIG. 4 depicts what may be referred to as handling damage. Handling damage generally results after the various layers are laminated together and the laminate is shipped, installed, and/or used. For example, during shipping, installation, and/or use, the laminate jacket pipe insulation product 400 may be bent, dinged, impressed, imprinted, etc. which may result in one or more visible scars. The visible scars degrade the overall appearance of the laminate jacket pipe insulation product 400, which is manufactured to provide a smooth and visually appealing surface.

FIG. 4 depicts the laminate jacket pipe insulation product 400 fitted around a section of pipe 406. The laminate jacket 402 of the laminate pipe insulation product 400 includes one or more visible scars 404 that may occur during handling of the laminate jacket pipe insulation product 400. For example, during installation, the installer may bend, cut, impress, etc. the laminate 402 as the laminate jacket pipe insulation product 400 is fitted around the pipe 406 and sealed to itself or to another laminate insulation product. The visible scars 404 may include impressions or imprints from the installer's fingers, creases from bending the laminate, impressions from one or more dents, etc.

Employing a metallized polymeric film sheet inner layer in the laminate application of the present invention (e.g., metallized polyethylene terphthalate (MPET)), greatly reduces the visible scars due to handling. In other words, the metallized polymeric film sheet inner layer provides increased resistance to handling damage. Compared to traditional laminates, these laminates may take more abuse during shipment, handling, or in use while maintaining a visually appealing appearance.

A laminate's resistance to handling damage may be measured using one or more methods. One such method may include applying a crease to the laminate, such as by using a weighted jig to bend a portion of the laminate 180 degrees so that the bent portion of the laminate folds back onto the laminate. The jig may then be removed and the angle of recovery may be measured. The angle of recovery is the angle formed as the crease unfolds (i.e., as the bent portion unfolds). For example, if a corner of the laminate is folded 180 degrees and the corner unfolds so that it is substantially perpendicular to the laminate, the angle of recovery would be roughly 90 degrees. The greater the angle of recovery measured, the more resistant the laminate is to handling damage, or in other words, the more able the laminate is to recover from any handling damage. An angle of recovery of 180 degrees would indicate essentially no damage due to handling while an angle of 5 degrees or less would indicate virtually no recovery (i.e., nearly 100% damage). The described method of testing handling damage resistance was applied to various laminates with the results provided in FIG. 6.

Figure 6:
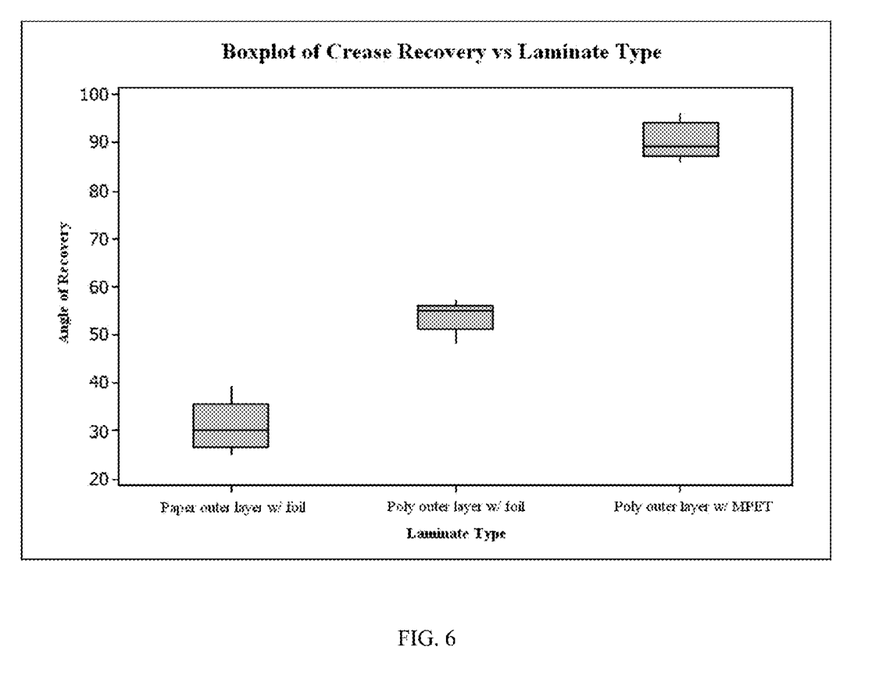
FIG. 6 is a box plot graph showing the handling damage resistance for a variety of laminates.

As shown in FIG. 6, employing the MPET material in a laminate application provides significant handling damage resistance compared to laminates that employ aluminum foil. The polymeric film outer layer—MPET inner layer laminate provides nearly three times the resistance to handling damage compared with a paper outer layer—aluminum foil inner layer laminate. Similarly, the polymeric film outer layer—MPET inner layer laminate provides nearly two times the resistance compared to a laminate employing a combination of a polymeric film outer layer—aluminum foil inner layer. Thus compared to other laminates, a laminate comprising a polymeric film outer layer and a metallized polymeric film inner layer (i.e., MPET) may take increased abuse during shipment, handling, or in use and maintain a more scar free visually appealing outer surface.

FIG. 5 depicts environmental damage that may occur after installation of the laminate jacket (i.e., while the laminate is in use). FIG. 5 shows a laminate jacket pipe insulation product 500 that includes a laminate jacket 502 that is fitted about a pipe section 506. The laminate jacket 502 includes a plurality of visual scars 504 due to one or more environmental conditions that the laminate jacket 502 may be exposed to (e.g., temperature, humidity, sunlight, etc.). One type of common visual scar 504 due to environmental conditions is what may be referred to as dimpling or wrinkling of the outer layer of the laminate. This deformation or wrinkling of the laminate outer surface may adversely affect the visual appeal of the laminate jacket pipe insulation product 500 by changing the surface from a smooth visibly pleasing surface to a surface having a visually unappealing mottled finish that can resemble the dimples on a golf ball. The deformation and wrinkling (i.e., dimpling) of the laminate outer layer is generally caused by stresses within or internal to the laminate. The internal stresses may be caused by and/or enhanced when the laminate is used in high heat and humidity environments. The internal stresses cause the laminate to become dimensionally unstable, expand, deform, and wrinkle when exposed to conditions of high heat and humidity.

Utilizing a polymeric film sheet outer layer in addition to the metallized polymeric film sheet inner layer in the laminate application described herein provides superior resistance to environmental damage, such as dimpling. Such laminates are ideal for use in high heat and humidity environments due to the increased resistance to wrinkling or dimpling. The combination of the polymeric film sheet outer layer and metallized polymeric film sheet inner layer reduces the internal stresses otherwise present in other laminates under these conditions. For example, a laminate that employs a combination of a kraft paper outer layer with an metallized polymeric film inner layer may be more susceptible to wrinkling or dimpling because the internal stresses are increased.

A laminate's resistance to environmental damage may be measured using one or more methods. One such method may include placing one or more laminate jacket pipe insulation products in a controlled environment to evaluate the effects of the environment on the laminate. For example, to evaluate the effects of high heat and humidity, laminate jacket pipe insulation products may be placed for a predetermined amount of time in an environment that simulates a high heat and humidity environment (e.g., 3 or 4 laminate jacket pipe insulation products may be placed in a environment of 85 degrees Fahrenheit and 85% relative humidity for 3-5 days). The effects of the environment on the laminate may be accelerated by increasing the heat, humidity, and/or exposure to the environment (e.g., temperature greater than or equal to 90 degrees Fahrenheit; relative humidity greater than or equal to 90% relative humidity; exposure between 1 and 30 days, etc.).

After being exposed to the controlled environment, the dimpling or wrinkling of the laminate's outer surface may be measured and quantified. The dimpling or wrinkling may be quantified using a 10 pt scale where the following scores indicate the following amount of environmental damage: a score of 2 indicates a laminate with large and deep dimples/wrinkles that cover the majority of the laminate's outer surface; a score of 4 indicates a laminate with a mixed combination of large, small, deep, and shallow dimples/wrinkles that are fewer in overall number, but still prevalent over the laminate's surface; a score of 6 indicates a laminate with small and shallow dimples/wrinkles (may have a few deep dimples) that are few in overall number; a score of 8 indicates a laminate with very few dimples/wrinkles that are small and shallow; and a score of 10 indicate a laminate with no visible dimpling/wrinkling. The intermediate numbers (1, 3, 5, 7, 9) may be used to show environmental damage between these numbers. This testing method was applied to various laminate configurations with the results provided in Table 1 below.

TABLE 1

|  | Paper outer layer w/ Foil | Paper outer layer w/ MPET | Poly outer layer w/ Foil | Poly outer layer w/ MPET |
|---|---|---|---|---|
| Environmental Damage Score | 6 | 4 | 9-10 | 9-10 |

Table 1: Environmental damage for various laminates. The table uses a 10 pt scale to quantify the damage with a score of 10 indicating no visible environmental damage.

As can be seen from Table 1, the addition of the MPET layer with the kraft paper outer layer decreases the laminates resistance to environmental damage (i.e., makes the laminate more susceptible to environmental damage), while the polymeric film outer layer and metallized polymeric film inner layer provides superior resistance to such damage (i.e., the laminate exhibits virtually no visible damage after exposure to the controlled environment). Table 2 below provides a brief overview of the two types of damage described herein and a comparison of the various laminates of the present invention in relation to the two types of damage. The environmental damage score provided in Table 2 is taken from Table 1, while the handling damage score represents the angle of recovery measured for each of the laminates in the manner described previously.

TABLE 2

|  | Paper outer layer w/ Foil | Paper outer layer w/ MPET | Poly outer layer w/ Foil | Poly outer layer w/ MPET |
|---|---|---|---|---|
| Environmental Damage Score | 6 | 4 | 9-10 | 9-10 |
| Handling Damage Score | 25 | 90 | 40 | 90 |

Table 2: Summary of environmental and handling damage for various laminates. The environmental damage score is based on the scores provides in Table 1, while the handling damage score paper represents the angle of recovery described in relation to FIG. 6.

As provided in Table 2, the laminate that employs a polymeric film outer layer and a metallized polymeric film inner layer is the only laminate that provides superior resistance to both environmental damage and handling damage. While each of the laminates of the present invention provide some protection against both types of damage and/or provide increased protection against one type of damage, the laminate that employs both the polymeric film outer layer and metallized polymeric film inner layer is better able to retain the initial, as installed, smooth unwrinkled (i.e., undimpled) appearance even after being subjected to numerous cycles of high heat and humidity and after being impressed, cut, dented, etc. during handling, shipping, or use.

Figure 7:
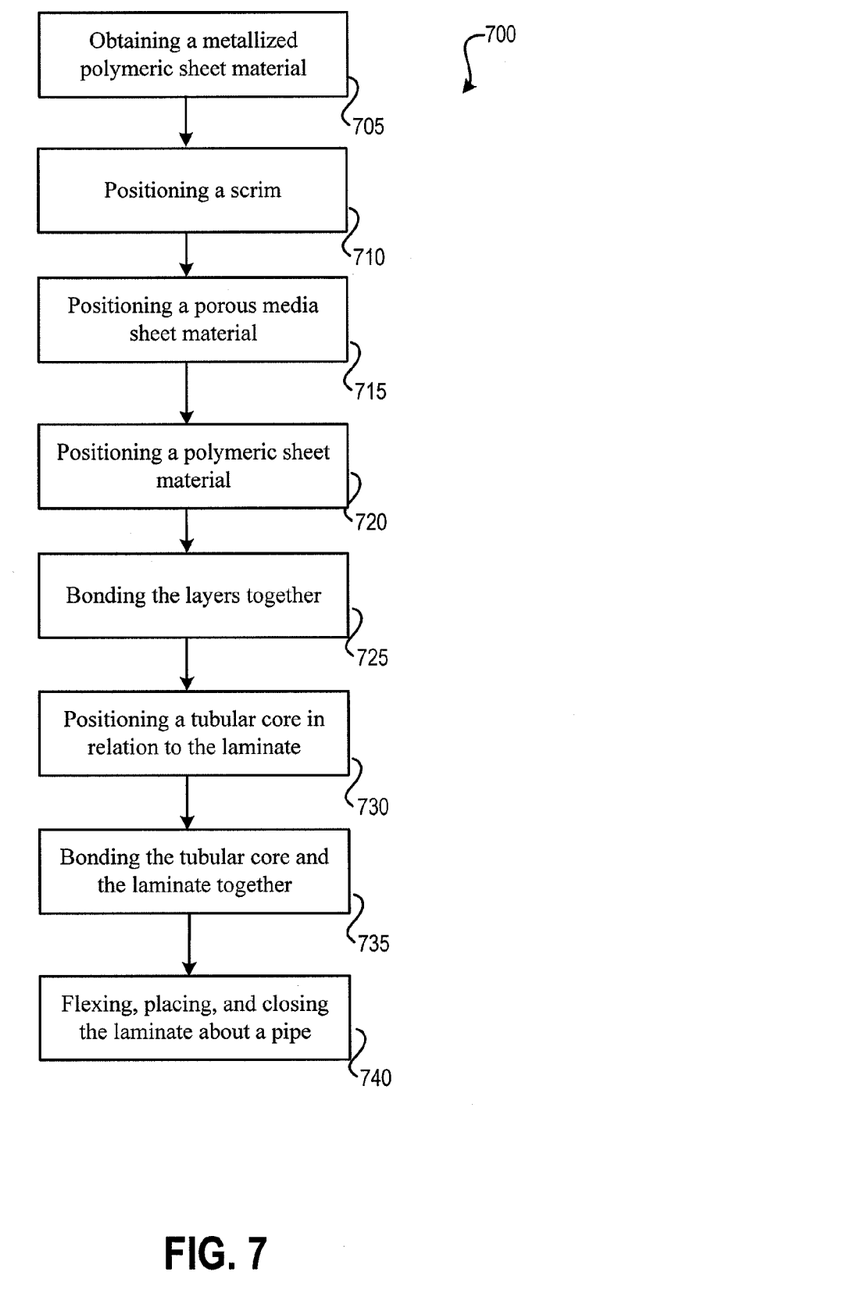
FIG. 7 illustrates a method for producing a laminate jacket for a pipe insulation product.

FIG. 7 illustrates a method 700 for producing a laminate jacket for a pipe insulation product. At block 705, a metallized polymeric sheet material may be obtained. The metallized polymeric sheet material may form an inner layer of the laminate and may provide a fluid vapor barrier to minimize fluid vapor transmission through the laminate. At block 710, a scrim may be positioned in relation to the metallized polymeric sheet material (e.g., adjacent to the metallized polymeric sheet material). At block 715, a porous media sheet material may be positioned in relation to the scrim or metallized polymeric sheet material (e.g., adjacent to the scrim).

At block 720, a polymeric sheet material may be positioned in relation to the other layers of the laminate (e.g., adjacent to the porous media). The polymeric sheet material may form an outer exposed layer of the laminate. At block 725, the metallized polymeric sheet material, the scrim, the porous media, and the polymeric sheet material may be bonded together with an adhesive to form the laminate jacket. At block 730, a tubular core of insulating material may be positioned in relation to the laminate (e.g., adjacent to the metallized polymeric sheet material). The tubular core may include a length and a longitudinal axis, a cylindrical outer surface, a substantially cylindrical inner surface, and a wall extending between the cylindrical outer surface and the cylindrical inner surface.

At block 735, the laminate and tubular core may be bonded together with an adhesive material to form a pipe insulation product. The pipe insulation product may be flexible so that the tubular core and laminate jacket can be opened, placed about a pipe, and closed without degrading the laminate jacket. At block 740, the laminate and tubular core may be flexed, placed about a pipe, and closed about the pipe.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

As used herein and in the appended claims, the singular forms "a", "an", and the include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method for producing a laminate jacket for a pipe insulation product, the method comprising:
   obtaining a metallized polymeric sheet material, the metallized polymeric sheet material forming an inner layer of the laminate that provides a fluid vapor barrier to minimize fluid vapor transmission through the laminate, the metallized polymeric sheet material comprising:
   a length,
   a width,
   a first face, and
   a second face, wherein the length and width form an area that define the first face and the second face;
   positioning a scrim adjacent the second face, wherein the scrim comprises a mesh of a plurality of fibers, and wherein the scrim is substantially coextensive with the second face;

positioning a porous media sheet material adjacent the scrim, wherein the porous media is substantially coextensive with the second face;

positioning a polymeric sheet material adjacent the porous media, wherein the polymeric sheet material is coextensive with the second face, and wherein the polymeric sheet material forms an outer exposed layer of the laminate; and bonding, via an adhesive material, the metallized polymeric sheet material, the scrim, the porous media, and the polymeric sheet material together to form the laminate jacket.

2. The method for producing a laminate jacket as in claim 1, the method further comprising:

positioning a tubular core of insulating material, directly adjacent the first face of the metallized polymeric sheet material, wherein the tubular core comprises:

a length and a longitudinal axis;

a substantially cylindrical outer surface, the substantially cylindrical outer surface comprising a surface area that is roughly equivalent to the area of the first face;

a substantially cylindrical inner surface; and a wall extending between the cylindrical outer surface and the cylindrical inner surface; the wall comprising:

a radially extending thickness; and a slit extending completely there through, wherein the slit extends parallel to the longitudinal axis of the tubular core for the length of the tubular core; and bonding, via an adhesive material, the tubular core of insulating material with the first face of the metallized polymeric sheet material to form the pipe insulation product, wherein the pipe insulation product is flexible so that the tubular core and laminate jacket can be opened, placed about a pipe, and closed without degrading the laminate jacket.

3. The method for producing a laminate jacket as in claim 1, wherein the metallized polymeric sheet material comprises a metallized polyethylene terphthalate (MPET).

4. The method for producing a laminate jacket as in claim 1, wherein the polymeric sheet material is selected from the group consisting of:
polypropylene;
polyethylene;
polyvinyl chloride;
vinyl;
saran;
polyethylene terephthalate; and
thermoplastic polyolefin.

5. The method for producing a laminate jacket as in claim 1, wherein the adhesive comprises a latex based adhesive, and wherein the adhesive contains one or more additives selected from the group consisting of:
a flame retardant; and
an anti-microbial agent.

6. The method for producing a laminate jacket as in claim 5, wherein the anti-microbial agent comprises thiabendazole, and wherein the flame retardant additive comprises one or more of the following: aluminum tri-hydrate (ATH), a brominated compound, and antimony.

7. A method for insulating a pipe having a cylindrical outer surface and a hollow interior for passing a fluid there through, the method comprising:

providing a tubular core of insulating material, the tubular core comprising:

a length and a longitudinal axis;

a substantially cylindrical outer surface;

a substantially cylindrical inner surface that is sized to correspond to cylindrical outer surface of the pipe; and a wall extending between the cylindrical outer surface and the cylindrical inner surface, the wall of the tubular core having a radially extending thickness, the wall of the tubular core having a slit extending completely there through, the slit extending parallel to the longitudinal axis of the tubular core for the length of the tubular core; and bonding a laminate to the tubular core, wherein the laminate is coextensive with the substantially cylindrical outer surface of the tubular core, the laminate comprising:

a metallized polymeric film sheet layer forming an inner layer of the laminate, wherein the metallized polymeric film sheet layer is bonded to the substantially cylindrical outer surface of the tubular core, and wherein the metallized polymeric film sheet layer provides a fluid vapor barrier to minimize fluid vapor transmission through the laminate;

a scrim comprising a mesh of a plurality of fibers;

a porous media sheet layer, wherein at least one of the scrim and the porous media sheet layer provide reinforcement for the laminate;

a polymeric film sheet layer forming an outer exposed layer of the laminate, wherein the polymeric film sheet layer inhibits the absorption of fluid by the porous media; and an adhesive, wherein the adhesive bonds the metallized polymeric film sheet layer, the scrim, the porous media sheet layer, and the polymeric film sheet layer together;

flexing the tubular core and laminate to open the laminate and tubular core;

placing the laminate and tubular core about the pipe; and closing the laminate and tubular core about the pipe without degrading the laminate, wherein at least a portion of the pipe is fully encased within the laminate and tubular core;

wherein the laminate provides increased resistance to handling damage during the installation of the laminate and tubular core, and wherein the laminate provides increased resistance to wrinkling when exposed to conditions of high humidity.

8. The method for insulating a pipe as in claim 7, further comprising flowing a fluid through the pipe, wherein the temperature of the fluid is lower than the temperature in close proximity to the laminate's outer surface, and wherein the metallized polymeric film sheet layer substantially reduces the amount of fluid vapor that penetrates through the laminate from the laminate's exterior.

* * * * *